April 21, 1970  J. L. CADLEY  3,507,523
DISCONNECTABLE COUPLING FOR FLUID PRESSURE LINES
Filed Feb. 25, 1969
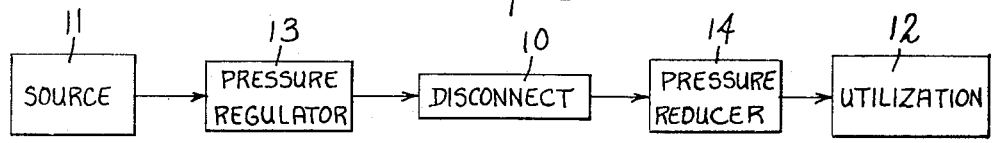
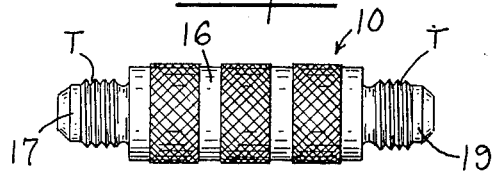
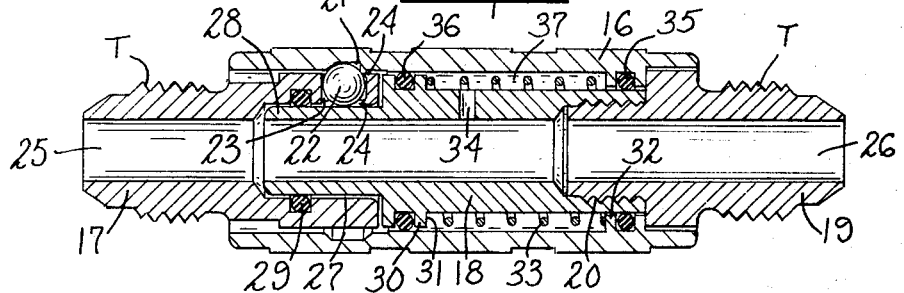
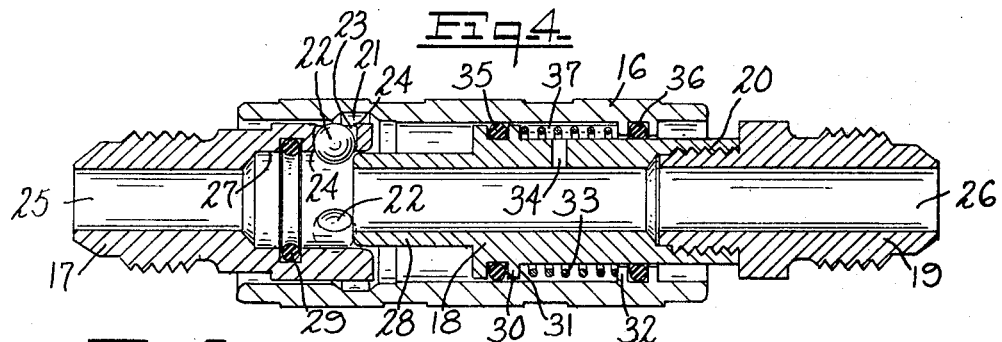
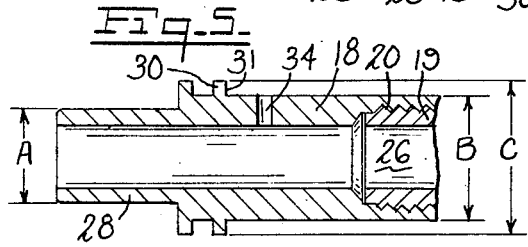
INVENTOR
John L. Cadley
BY DeLio and Montgomery
ATTORNEYS United States Patent Office 3,507,523
Patented Apr. 21, 1970

3,507,523
DISCONNECTABLE COUPLING FOR FLUID PRESSURE LINES
John L. Cadley, Milford, Conn., assignor to Air-Lock, Inc., Milford, Conn.
Filed Feb. 25, 1969, Ser. No. 801,987
Int. Cl. F16l 37/00, 37/18
U.S. Cl. 285—307                7 Claims

ABSTRACT OF THE DISCLOSURE

A fluid pressure line connector which is disconnectable at a predetermined force. The device is arranged such that the line pressure produces a pressure balancing effect on the coupling members such that the force required for disconnection is independent of line pressure.

---

This invention relates to couplings, and more particularly relates to a disconnectable coupling for use in a fluid pressure line.

The present invention provides a disconnect assembly for use in a fluid pressure line. One application of a disconnect assembly embodying the invention would be in a pilot's oxygen line. In case of emergency egress from the plane such oxygen line should be disconnectable with a minimum force. However, such disconnect assembly should be positively lockable and preferably permit relative swiveling of the parts.

The present invention provides such a disconnect assembly which is simple and economical in construction, which permits rapid and positive connection of the ends of fluid pressure conduits, and which may be quickly and easily disconnected with a predetermined pull regardless of the fluid pressure in the line and through the disconnect assembly. The disconnect assembly is further so arranged that the parts thereof permit the attached pressure lines to swivel relative to and independently of each other.

An object of this invention is to provide a new and improved disconnect assembly for use with a fluid pressure line.

Another object of this invention is to provide a fluid pressure line coupling including a disconnect assembly having a new and improved construction which facilitates disconnection thereof upon application of a predetermined force regardless of the magnitude of the pressure in the line.

A further object of this invention is to provide a coupling for fluid pressure lines in which the coupling may be quickly made and the coupling parts positively locked together.

The features of the invention which are believed to be novel are pointed out with particularity and distinctly claimed in the concluding portion of this specification. However, the invention both as to its organization and operation, together with further objects and advantages thereof, may best be appreciated by reference to the following detailed description taken in conjunction with the drawings, wherein:

FIG. 1 is a flow diagram in block form exemplifying the environment in which the invention may be utilized;

FIG. 2 is a view of a disconnect assembly embodying the invention;

FIG. 3 is a view in longitudinal half section of the disconnect assembly of FIG. 2 with the parts joined;

FIG. 4 is a view in longitudinal half section of the disconnect assembly in which the parts are shown just prior to locking engagement; and FIG. 5 is a fragmentary view in longitudinal half section of one of the locking members of the disconnect assembly.

A connecting assembly adapted to be rapidly disconnected and exemplified by reference numeral 10, may be utilized in a fluid pressure line between a pressure source 11 and a utilization device 12 which in the case of aircraft usage may be the pilot. This fluid pressure system may include a pressure regulator 13 and also a pressure reducing device 14. In the environment described, the regulator pressure may be seventy pounds as applied to the disconnect and reduced thereafter to a much smaller value before the utilization device.

A disconnect assembly 10 embodying the invention generally comprises a sleeve-like body member 16 and first and second coupling members 17 and 18. Member 18 further includes a port member 19 secured thereto as by means of threads 20 which may be further bonded with an epoxy cement. The coupling members may be provided with suitable connections to fluid pressure lines or hoses as exemplified by the threads T. The member 17 provides a female connection member while the member 18 provides a male connection member. Sleeve or shell member 16 has a detent groove 21 defined in its inner peripheral surface adapted to receive a plurality of detent balls 22 carried by member 17. The detent balls 22 are held in sockets 23 in member 17 as by being staked therein, as more clearly shown at 24.

Defined in member 17 is a fluid passage 25 which communicates with fluid passage 26 of the same diameter in members 18 and 19. A larger bore 27, coaxial with passage 25, is defined in member 17 and is adapted to receive a cylindrical projection 28 of member 18 therein when in a locked condition. An annular groove defined in the inner periphery of bore 27 receives a seal 29 to provide a fluid tight seal when the parts are in full engagement as shown in FIG. 3.

Defined on member 18 is an upstanding flange 30 which defines an annular surface 31 which functions in one aspect as a spring seat. An inwardly extending annular flange 32 on sleeve member 16 also defines a spring seat. Disposed about member 18 between flange 32 and surface 31, is a helical spring 33 which through action on surface 31 urges member 18 to the left as viewed in FIG. 3. A port 34 provides fluid communication between passage 26 and an elongated chamber defined about member 18. Seals 35 and 36 make the annular chamber 37 defined by member 18 and shell member 16 fluid tight.

The assembly as shown in its operative position in FIG. 3 has the detent balls 22 forced into detent groove 21 by the projection 28 on member 18. The pressure in passage 26 acting on the area defined by diameter A of member 18 (see FIG. 5) tends to urge member 18 to the right as viewed in FIG. 3. This force is reacted by the compression of spring 33 and, further, by the air pressure in chamber 37 acting against surface 31. In accordance with one aspect of the invention, the area of surface 31 defined by the difference in the diameters B and C, FIG. 5, is selected to be substantially equal to the area effectively defined by diameter A at the end of projection 28. The area defined by the diameter A may be spoken of as the effective area inasmuch as the reducing valve or utilization device downstream of the coupling will be acted upon by the pressure in passage 26. In this manner, the fluid pressure acting on member 18 is essentially equal and in opposite directions and essentially the only force required to effect disconnection of the assembly is that due to the spring 33. Accordingly, the force required to disconnect the coupling is independent of the pressure in passages 25 and 26.

FIG. 4 exemplifies the coupling members in a position either just prior to coupling or decoupling.

The member 17 may be positively coupled in place by forcing it into shell 16 such that the detent balls 22 act against projection 28 and retract member 18 against spring 33. When member 17 has been inserted a sufficient distance such that detent balls 22 are adjacent groove 21, spring 33 will force member 18 forward and projection 28 will drive the balls 22 radially outwardly and into groove 21, thus providing a positive lock between the elements. Alternatively, member 19 may be pulled out, member 17 inserted in sleeve 16, and member 19 released to effect a positive lock.

To disconnect member 17, one may simultaneously grab member 17 and member 18 and pull them apart with a sufficient force to overcome spring 33. Alternatively, one could grasp sleeve member 16 and pull member 19 against spring 33. If there is any pressure in passages 25 and 26, such pressure would force member 17 outwardly of shell 16.

In the event the disconnect 10 is in an environment where it couples a fluid source to a movable utilization device such as a pilot's helmet, member 17 would essentially be anchored by the line to which it is attached. Therefore, if the pilot found it necessary to leave the aircraft in an emergency, any pull on member 19 whether applied by the hands, or not, of a sufficient magnitude to overcome spring 33 would effect disconnection of member 17 from member 18 and sleeve 16.

Inasmuch as the coupling is in an essentially balanced state with pressure therethrough and the force required for disconnection is merely that of spring 33 which may be, say, on the order of fifteen to twenty pounds, relative swiveling of members 17 and 18 within shell 16 is permitted.

It will be apparent that the relative areas upon which the fluid pressure acts may be predetermined such that the disconnect force varies as a function of such areas and the fluid pressure.

While a preferred embodiment of the invention has been described as applied to a particular application or environment it is to be understood that apparatus embodying the invention may be utilized in any environment where it is necessary or desired to have a disconnectable coupling in a fluid pressure line where the force required for disconnection is independent of the pressure in the line.

It may thus be seen that the objects of the invention set forth above, as well as those made apparent from the foregoing description, are efficiently attained. While a preferred embodiment of the invention has been set forth for purposes of disclosure, other embodiments of the invention as well as modifications to the disclosed embodiments may occur to those skilled in the art which do not depart from the spirit and scope of the invention.

What is claimed is:

1. A coupling for fluid pressure lines comprising, an outer sleeve member, a first coupling member having a passage therethrough and a bore larger than said passage communicating therewith, a second coupling member positioned within and carrying said sleeve having a passage therethrough providing a continuation of the passage in said first coupling member, said first coupling member having means carrying a plurality of detents so as to have essentially no axial movement relative to said first coupling member detent means defined in the inner preiphery of said sleeve member, means urging said second coupling member into said sleeve member and said first coupling member, said second coupling member being movable against said urging means, said second coupling member including a projecting portion having a substantially cylindrical peripheral surface received within said bore and holding said detents outwardly into said detent means whereby said sleeve is held against axial movement relative to said first member.

2. The coupling of claim 1 wherein said sleeve member and said second coupling member define a fluid tight chamber about said second coupling member, said urging means comprising a helical spring disposed about said second coupling member, said spring held in compression between a first seat defined on said second coupling member and a second seat defined on said sleeve member, said spring acting on said first and second seats to urge said second coupling member into said sleeve.

3. The coupling of claim 2 wherein a port is defined in said second coupling member providing fluid communication between the passage through said coupling and said chamber.

4. The coupling of claim 3 wherein the area of said first seat is substantially equal to the area defined at the end of said second coupling member and effectively acted upon by the fluid pressure in said coupling.

5. A coupling for fluid pressure lines comprising a sleeve member, first and second coupling members defining a continuous passage therethrough, said second coupling member positioned within and carrying said sleeve member, said first coupling member having means carrying a plurality of detents so as to have essentially no axial movement relative to said first coupling member, detent means defined in the inner periphery of said sleeve member, a substantially cylindrical projection defined on said second member fitting within said first coupling member and forcing and holding the detents therein radially outwardly into said detent means whereby said sleeve is held against axial movement relative to said first member, said second coupling member and said sleeve member defining a fluid pressure chamber about said second coupling member, a port defined in said second coupling member and providing fluid communication between said passage and said chamber, spring means urging said second coupling member into said sleeve and said first coupling member, a surface defined on said second coupling member in said chamber in a plane transverse to the passage therethrough so that fluid pressure acting on said surface urges said second coupling member into said sleeve.

6. The coupling of claim 5 wherein said spring is disposed in said chamber and acts on said second coupling member through said surface while reacting on said sleeve.

7. The coupling of claim 5 wherein the area of said surface acted on by the fluid pressure is substantially equal to the area of said second coupling member effectively acted upon by the fluid pressure in the passage.

References Cited

UNITED STATES PATENTS

| | | | |
|---|---|---|---|
| 2,727,761 | 12/1955 | Elliott et al. | 285—316 X |
| 3,140,072 | 7/1964 | Sciuto et al. | 285—277 X |
| 3,337,244 | 8/1967 | Appleberry | 285—277 X |

FOREIGN PATENTS

| | | |
|---|---|---|
| 40,847 | 5/1965 | Germany. |
| 746,807 | 3/1956 | Great Britain. |

DAVID J. WILLIAMOWSKY, Primary Examiner

D. W. AROLA, Assistant Examiner

U.S. Cl. X.R.

285—316